United States Patent
Cai et al.

(10) Patent No.: US 9,818,080 B2
(45) Date of Patent: Nov. 14, 2017

(54) CATEGORIZING A USE SCENARIO OF A PRODUCT

(71) Applicant: International Business Machines Corporation, Armonk, NY (US)

(72) Inventors: Keke Cai, Beijing (CN); HongLei Guo, Beijing (CN); Wei Hong Qian, Beijing (CN); Zhong Su, Beijing (CN); Li Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/539,319

(22) Filed: Nov. 12, 2014

(65) Prior Publication Data
US 2015/0154537 A1   Jun. 4, 2015

(30) Foreign Application Priority Data

Nov. 29, 2013 (CN) .......................... 2013 1 0628364

(51) Int. Cl.
*G06F 17/30*   (2006.01)
*G06Q 10/08*   (2012.01)
*G06Q 30/02*   (2012.01)

(52) U.S. Cl.
CPC ....... *G06Q 10/087* (2013.01); *G06Q 30/0282* (2013.01)

(58) Field of Classification Search
None
See application file for complete search history.

(56) References Cited

U.S. PATENT DOCUMENTS

| | | | |
|---|---|---|---|
| 7,870,039 B1* | 1/2011 | Dom .................. | G06F 17/3071 705/26.41 |
| 7,885,859 B2* | 2/2011 | Dom ................ | G06F 17/30707 706/25 |
| 2008/0077471 A1* | 3/2008 | Musgrove ............. | G06Q 30/02 705/7.29 |
| 2009/0282019 A1* | 11/2009 | Galitsky ........... | G06F 17/30634 |
| 2009/0319342 A1* | 12/2009 | Shilman ............ | G06F 17/30864 705/7.41 |
| 2011/0137908 A1* | 6/2011 | Dom ................ | G06F 17/30707 707/740 |
| 2011/0279458 A1* | 11/2011 | Gnanasambandam | G06Q 30/0238 345/440 |
| 2013/0218914 A1* | 8/2013 | Stavrianou ........ | G06F 17/30654 707/755 |
| 2013/0332460 A1* | 12/2013 | Pappas .............. | G06F 17/30705 707/740 |

FOREIGN PATENT DOCUMENTS

WO     2013126648 A1     8/2013

* cited by examiner

*Primary Examiner* — Talia Crawley
(74) *Attorney, Agent, or Firm* — Cantor Colburn LLP (57) ABSTRACT

A method for categorizing a use scenario of a product is disclosed. The method includes extracting, from a text describing the use scenario of the product, at least one feature tuple capable of characterizing the use scenario and performing a latent semantic association analysis on the at least one feature tuple to obtain a latent topic sequence for the use scenario. Further, the method includes determining a product scenario category to which the use scenario belongs according to the latent topic sequence for the use scenario. Additionally, a corresponding apparatus is also disclosed.

2 Claims, 8 Drawing Sheets

CATEGORIZING A USE SCENARIO OF A PRODUCT

FOREIGN PRIORITY

This application claims priority to Chinese Patent Application No. 201310628364.X, filed Nov. 29, 2013, and all the benefits accruing therefrom under 35 U.S.C. §119, the contents of which in its entirety are herein incorporated by reference.

BACKGROUND

The present invention relates to an information mining and categorization technology, and more specifically, to a method and apparatus for categorizing a use scenario of a product.

Generally, when purchasing a product, a person would like to know more use scenarios of the product to determine whether the product meets his/her own demand. However, a product specification provides very limited description about use scenarios of the product.

Figure 2A:
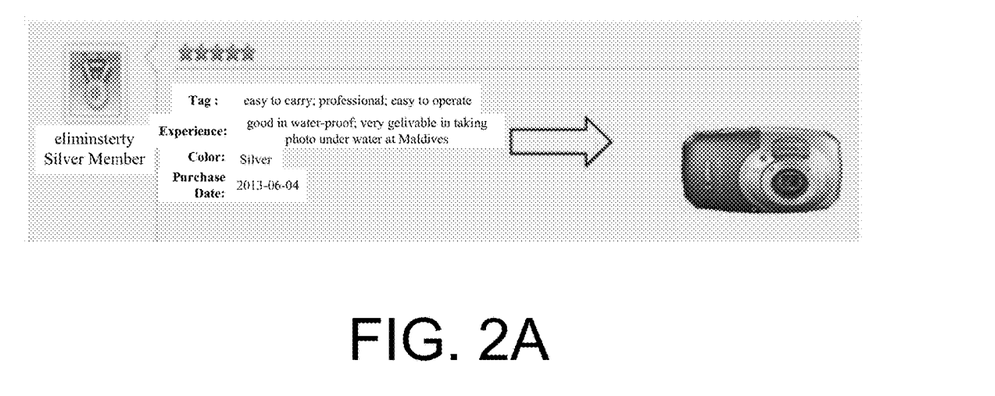
FIG. 2A an exemplary diagram of product reviews on a shopping website.
Figure 2B:
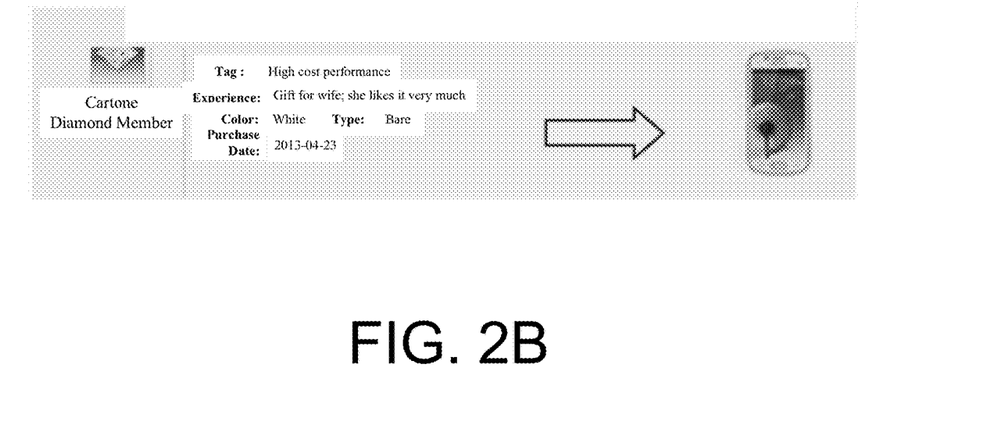
FIG. 2B an exemplary diagram of product reviews on a shopping website.

Currently, more and more people would like to share use experiences about a product on various shopping websites or social media (such as Microblog, Blog, virtual community, etc). Obviously, events (including activity, topic, etc.) related to a product mentioned in the description about use experiences can directly reflect the use scenarios of the product. FIG. 2A and FIG. 2B show examples of product reviews on a shopping website, wherein FIG. 2A shows the reviews for a water-proof camera, (b) shows the reviews for a mobile phone. According to the reviews in FIG. 2A, the information about one use scenario of the water-proof camera can be obtained, wherein "activity" is "photoing and shooting under water", "opinion" is "very good, very gelivable" (positive), "location" is "Maldives". Similarly, according to the reviews in FIG. 2A, the information about the use scenario of the mobile phone can be obtained, wherein "activity" is "give a present", "opinion" is "likes it very much" (positive).

Therefore, many people will search for related contents on the Internet before purchasing a product. However, such contents are very huge, and it is time consuming to obtain related information. Moreover, different persons may use different words to express the same meaning. Thus, although the related information can be obtained, more useful information may not be obtained.

On the other hand, online recommendation gradually becomes one way for product advertising. The existing online recommendation method is based on a keyword, wherein the keyword is contained in the recommended results. For example, when a keyword "Maldives" is searched for online, the relevant recommendation links such as "Maldives hotels", "Maldives air ticket", "Maldives view spots" and the like will appear. Actually, in some cases, such a recommendation cannot meet a customer's demand, e.g., a customer wants to a recommendation of products for the use scenario of "Maldives". Therefore, the existing online recommendation method cannot recommend the suitable products according to the use scenarios.

Therefore, it is desired to be capable of establishing an association between a product and a use scenario according to the description about use experiences of the product, categorizing the associations, and thus accurately recommending the product suitable for the use scenario required by the customer.

SUMMARY

According to one embodiment of the present invention, there is provided a method for categorizing a use scenario of a product, which includes extracting, from a text describing the use scenario of the product, at least one feature tuple capable of characterizing the use scenario, wherein the at least one feature tuple comprises a plurality of feature words; performing a latent semantic association analysis on the at least one feature tuple to obtain a latent topic sequence for the use scenario; and determining a product scenario category to which the use scenario belongs according to the latent topic sequence for the use scenario.

According to another embodiment of the present invention, there is provided a method for recommending a product based on a scenario, which includes detecting scenario information from contents posted on social media; searching the product scenario categories obtained by the above method for categorizing a use scenario of a product for at least one product scenario category matching the scenario information; and provisioning a product corresponding to the at least one product scenario category.

According to yet another embodiment of the present invention, there is provided an apparatus for categorizing a use scenario of a product, which includes an extraction module configured to extract, from a text describing the use scenario of the product, at least one feature tuple capable of characterizing the use scenario, wherein the at least one feature tuple comprises a plurality of feature words; an analysis module configured to perform a latent semantic association analysis on the at least one feature tuple to obtain a latent topic sequence for the use scenario; and a product scenario category determination module configured to determine a product scenario category to which the use scenario belongs according to the latent topic sequence for the use scenario.

According to still another embodiment of the present invention, there is provided an apparatus for recommending a product based on a scenario, which includes a product scenario category repository configured to store product scenario categories obtained by the apparatus for categorizing a use scenario of a product; a scenario detection module configured to detect scenario information from contents posted on social media; a search module configured to search the product scenario category repository for at least one product scenario category matching the scenario information; and a provision module configured to provision a product corresponding to the at least one product scenario category.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
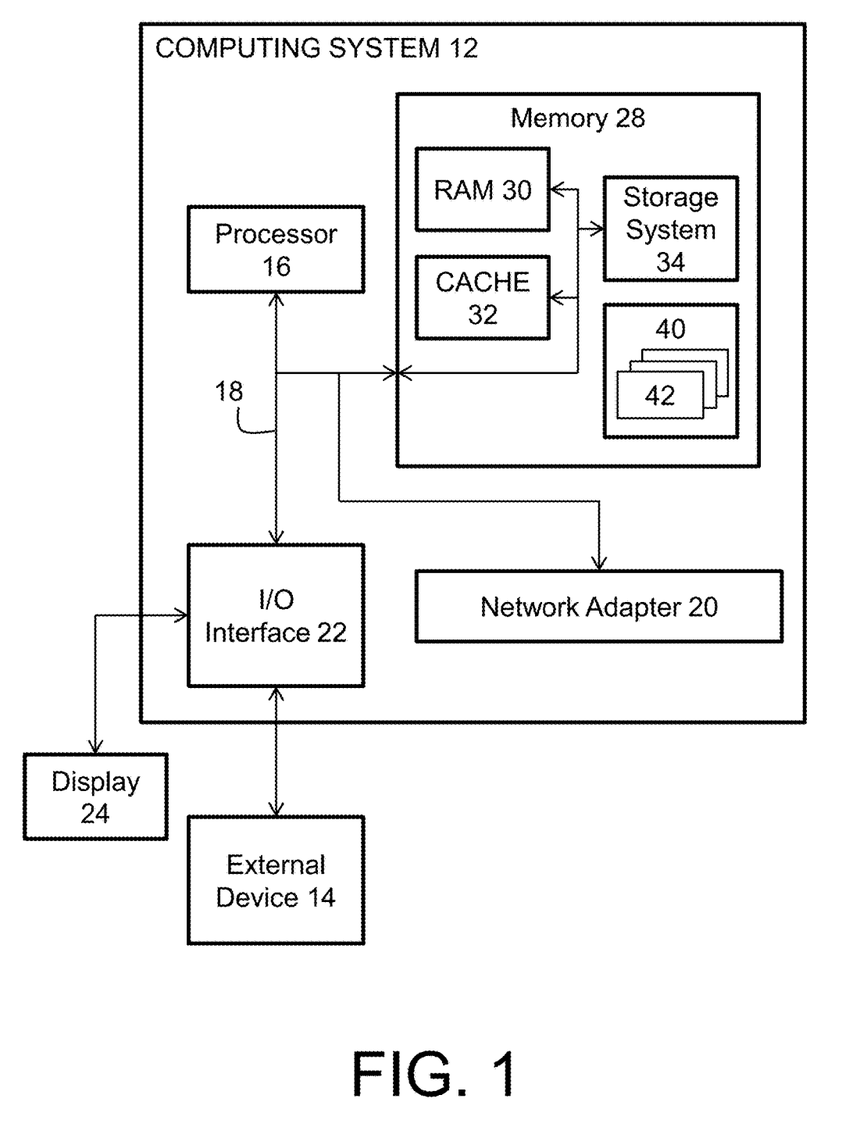
FIG. 1 shows a block diagram of an exemplary computer system/server 12 which is applicable to implement the embodiments of the present invention.

Referring now to FIG. 1, in which a block diagram of an exemplary computer system/server 12 that is configurable to implement the embodiments of the present invention is shown. Computer system/server 12 is only illustrative and is not intended to suggest any limitation as to the scope of use or functionality of embodiments of the invention described herein.

As shown in FIG. 1, then computer system/server 12 is shown in the form of a general-purpose computing device. The components of computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of the computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 3:
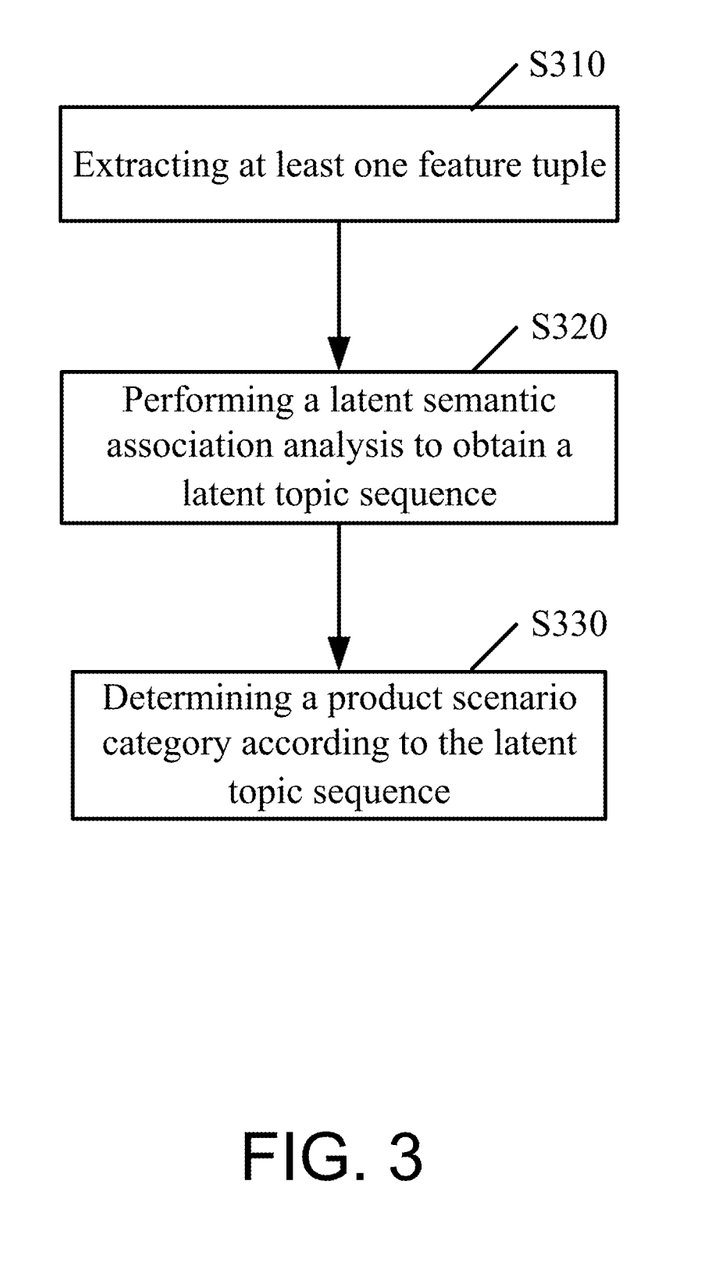
FIG. 3 is a flowchart of a method for categorizing a use scenario of a product according to an embodiment of the invention.

FIG. 3 shows a flowchart of the method for categorizing a use scenario of a product according to an embodiment of the invention. This embodiment will be described in detail below in conjunction with accompany drawings.

As shown in FIG. 3, at block S310, at least one feature tuple is extracted from a text describing the use scenario of the product (referred to as "product scenario text" hereinafter). In this embodiment, the feature tuple is capable of characterizing the use scenario described by the product scenario text. The feature tuple may comprise a plurality of feature words. The described use scenario can be substantially recovered via these feature tuples.

In this embodiment, the product scenario text may be selected from the purchase reviews for the product on shopping websites. Generally, the customer who has bought the product will share the experience and evaluation on the product using the purchase review, which can directly reflect the use scenario of the specific product. Furthermore, the product scenario text can also be selected from the contents related to a product posted on social media such as MicroBlog, Blog, virtual community, etc. Such contents can reflect the use scenario of a certain category of product.

Figure 4:
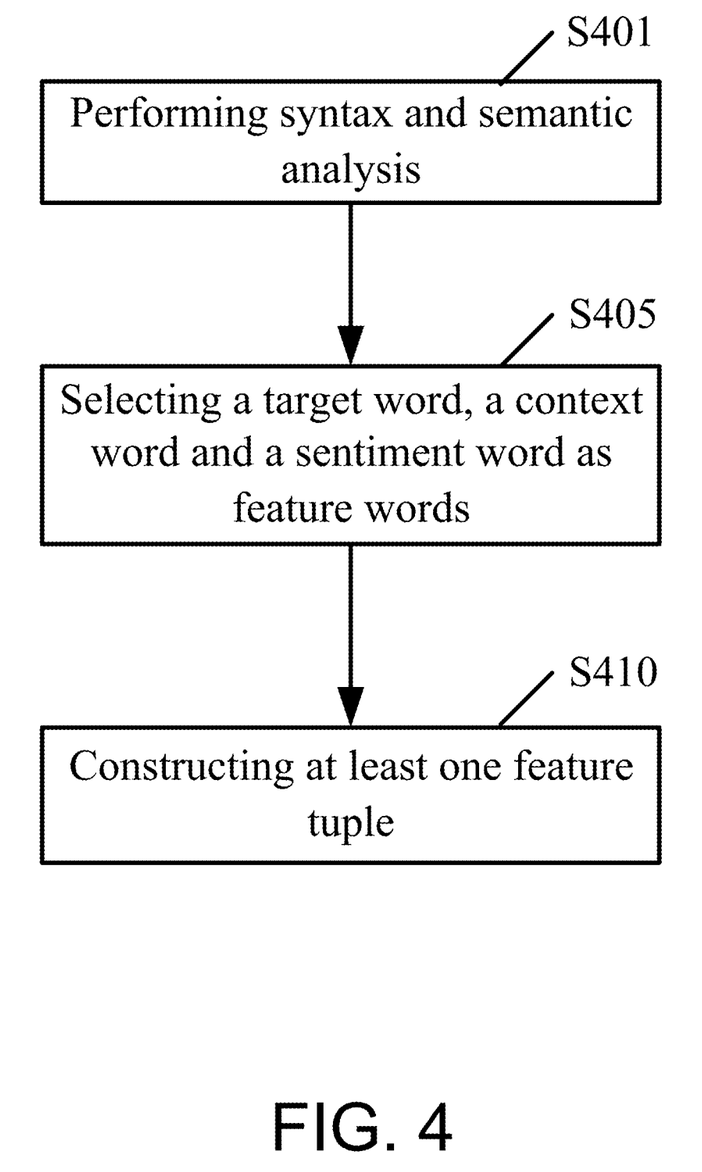
FIG. 4 is an illustrative flowchart of extracting a feature tuple in the method of the embodiment shown in FIG. 3.

FIG. 4 shows an illustrative flowchart of the block 310 of extracting feature tuple(s). As shown in FIG. 4, during the process of extracting feature tuple(s), at block S401, a syntax and semantic analysis is performed on the product scenario text, so as to obtain the meanings of sentences and words in the product scenario text. Here, the analysis may be performed by using any existing method for analyzing syntax and semantic.

Then, at block S405, a target word representing the product or an event involved in the use scenario of the product, a context word representing context of the use scenario and a sentiment word expressing an opinion are selected from the product scenario text. In this embodiment, the target word may be a word representing event, activity, topic, product name or product feature. The product feature may comprise appearance, function, quality of the product, etc. The context word may be a word representing location, person, time, or entity, noun phrase, or verb phrase. The sentiment word may be a word representing a positive opinion or a word representing a negative opinion. These target word, context word and sentiment word constitute the feature words capable of characterizing the use scenario.

The exemplary feature words that may be used to construct the feature tuple have been described above, those skilled in the art can appreciate that other feature words may also be used to construct the feature tuple.

After selecting the feature words, at block S410, at least one feature tuple is constructed. In this embodiment, the feature tuple is a triple comprising a target word, a context word related to the target word and a sentiment word related to the target word. Therefore, the feature tuple can further accurately reflect the relevance between the feature words. Thus, the product scenario text may be represented by a sequence comprising at least one feature tuple.

Return to FIG. 3, at block S320, a latent semantic association analysis is performed on the extracted at least one feature tuple to obtain a latent topic sequence for the use scenario. As mentioned above, different persons may use different words to express the same meaning. For example, the words "photoing", "taking photos", "taking pictures" represent the meaning of "taking photos". Thus, the same use scenario described by different persons may be totally different. To accurately categorize the use scenario, in this embodiment, the latent semantic association between the extracted feature tuples will be analyzed, so as to obtain the latent topic sequence for the use scenario described in the product scenario text.

Figure 5:
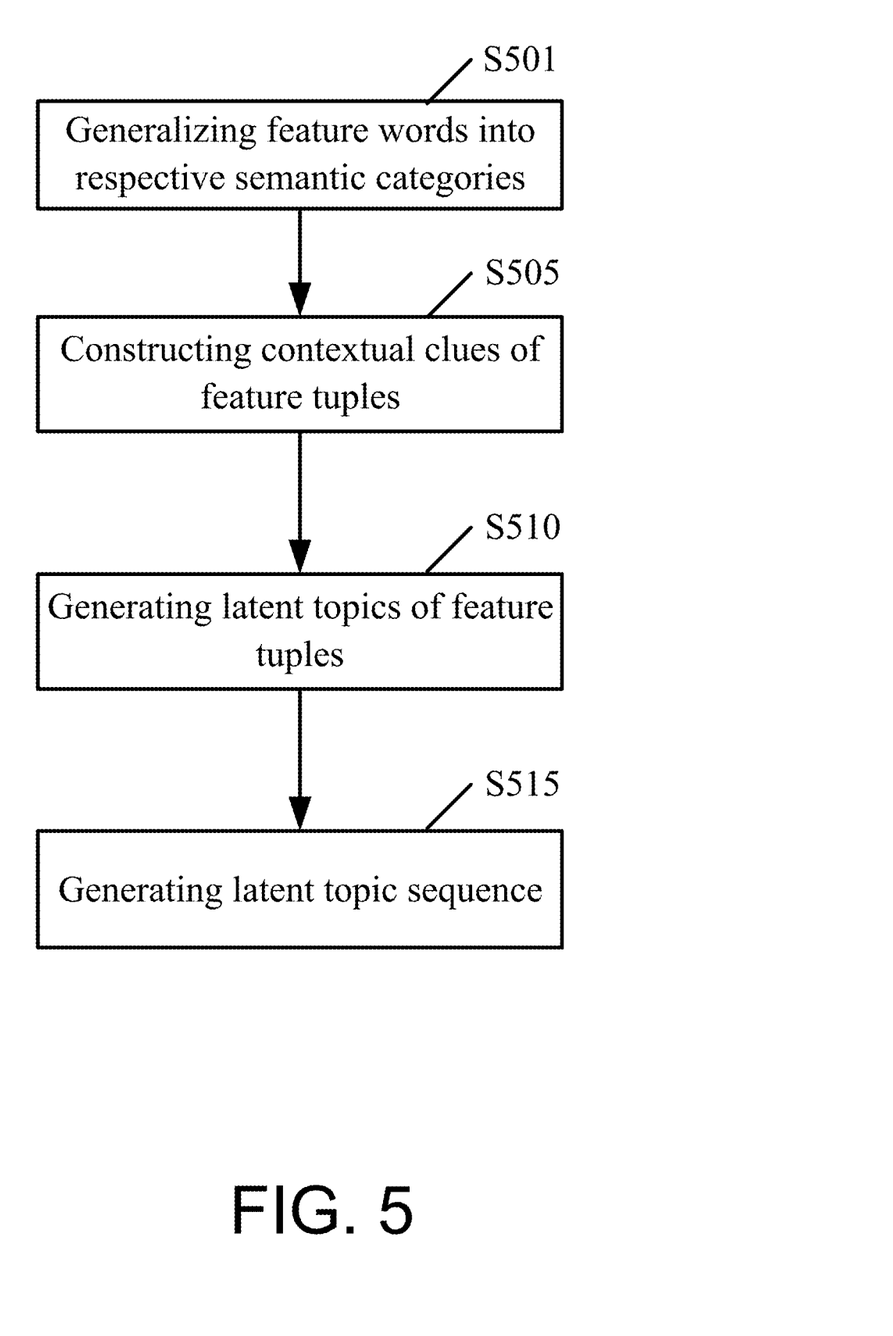
FIG. 5 is an illustrative flowchart of latent semantic association analysis in the method of the embodiment shown in FIG. 3.

FIG. 5 shows an illustrative flowchart of the block 320 of the latent semantic association analysis. As shown in FIG. 5, at block S501, each feature word in the respective feature tuples is generalized into its corresponding semantic category. The feature tuple(s) extracted from the product scenario text in block S310 can reflect the use scenario described in the product scenario text accurately. However, as different persons may use different words to express the same meaning, the feature words in such feature tuples are sparse. So it is necessary to generalize each feature word into the corresponding semantic category. As such, in the subsequent operations, each feature word may be replaced by a tag of the corresponding semantic category. In this embodiment, the feature word may be the target word, the context word and the sentiment word. Thus, the corresponding semantic category may comprise the specific event category, location category, product category, product feature category, positive expression category, negative expression category. In addition, each semantic category may further comprise various sub-categories. This block may allow the sparse feature words to be mapped to appropriate semantic categories.

Then, at block S505, for each feature tuple that has been semantically generalized, a contextual clue is constructed for the feature tuple. In this embodiment, the contextual clue may comprise the adjacent feature tuples of the feature tuple, and may also comprise noun phrase, verb phrase, transitional word (e.g., "however", "also", and so on) in the product scenario text other than the above feature tuples.

Then, at block S510, a pre-built latent semantic association model is applied to all the feature tuples and their contextual clues to generate the latent topic of the respective feature tuples. The latent semantic association model may be considered as a general probabilistic topic model, which can be used to capture the latent semantic association between the feature tuples and decompose these feature tuples into different latent topics. The latent semantic association model may be obtained in advance by training with a latent topic model such as Latent Dirichlet Allocation (LDA) or probabilistic Latent Semantic Indexing (pLSI). Then, at block S515, the latent topics of all the feature tuples constitute the latent topic sequence to represent the use scenario described in product scenario text.

Returning to FIG. 3, after generating the latent topic sequence for the use scenarios, at block S330, the product scenario category to which the use scenario belongs is determined according to the generated latent topic sequence.

In an embodiment, a pre-built product scenario categorization model is used to generate the product scenario category according to the latent topic sequence. In this embodiment, the product scenario categorization model is used to allocate one product scenario category to one latent topic sequence.

In another embodiment, similarities between the latent topic sequence and pre-set tag sequences of the product scenario categories are calculated. The calculation of similarity may employ any existing method for calculating similarity in the art. A plurality of product scenario categories may be set in advance, and each product scenario category has a tag sequence to represent the product scenario category. The maximum similarity may be obtained according to the calculation result. Then, the maximum similarity is compared with a predefined similarity threshold. In this embodiment, the similarity threshold is used to determine whether a new product scenario category should be generated. If the calculated maximum similarity is greater than or equal to the similarity threshold, the product scenario category with the maximum similarity is determined as the product scenario category to which the use scenario represented by the latent topic sequence belongs. If the calculated maximum similarity is less than the similarity threshold, it means that this latent topic sequence is not similar to any existing tag sequence, and a new product scenario category should be generated. The tag sequence of the generated new product scenario category may use this latent topic sequence.

It can be seen from the above description that the method for categorizing the use scenario of the product of this embodiment can effectively categorize the use scenario of the product into a suitable product scenario category according to the product scenario text shared by the customer, thereby enriching the use scenarios of the product.

The method for categorizing the use scenario of the product of the above embodiment will be further described below through a specific example.

Assuming that the product scenario text recites "Cruising on sea of Thailand is very interesting, fortunately I have brought the water-proof camera and took many wonderful undersea world photos, colorful sea fishes are so beautiful, they swam around me without being afraid of me, it appeared that I'm a mermaid too, losing my heart in the undersea world," then a plurality of triples can be extracted from the product scenario text. For example, the plurality of triples may include: T1<cruising on sea, Thailand, interesting>, T2<water-proof camera, N/A, fortunately brought>, T3<took photos, undersea world, beautiful>.

Next, the feature words in each triple are generalized into the respective semantic categories. In this example, the feature word "cruising on sea" in triple T1 may be generalized into the event category of "cruising on sea", the feature word "Thailand" may be generalized into the location category of "Thailand" and the feature word "interesting" may be generalized into the positive expression category. The feature word "water-proof camera" in triple T2 may be generalized into the product category of "water-proof camera", and the feature word "fortunately brought" may be generalized into the positive expression category. The feature word "took photos" in triple T3 may be generalized into the product feature category of "take photo", the feature word "undersea world" may be generalized into the location category of "undersea world", and the feature word "beautiful" may be generalized into the positive expression category. Thus, the semantically generalized triples are T1<Cate[cruising on sea], Location[Thailand], positive[interesting]>, T2<Product[water-proof camera], positive[fortunately brought]>, T3<PF take photo[took photos], Location[undersea world], positive[beautiful]>.

Then, for each generalized triple, the contextual clue is constructed. The contextual clue of triple T1 may be {<water-proof camera, N/A, fortunately brought>, took, beautiful, undersea world photos, colorful, sea fishes}, the contextual clues of triple T2 may be {<cruising on sea, Thailand, interesting>, took, beautiful, undersea world photos, colorful, sea fishes}, and the contextual clue of triple T3 may be {<water-proof camera, N/A, fortunately brought>, Thailand, cruising on sea, interesting, colorful, sea fishes}.

Then, the latent semantic association model is applied to the three triples and their contextual clues to generate the latent topics and obtain the latent topic sequence. In this example, the obtained latent topic sequence may be <"Thailand; cruising on sea; take photos", "water-proof camera; Thailand; travel", "Thailand; cruising on sea; take photos">. Then, the product scenario category may be determined according to the latent topic sequence.

Figure 6:
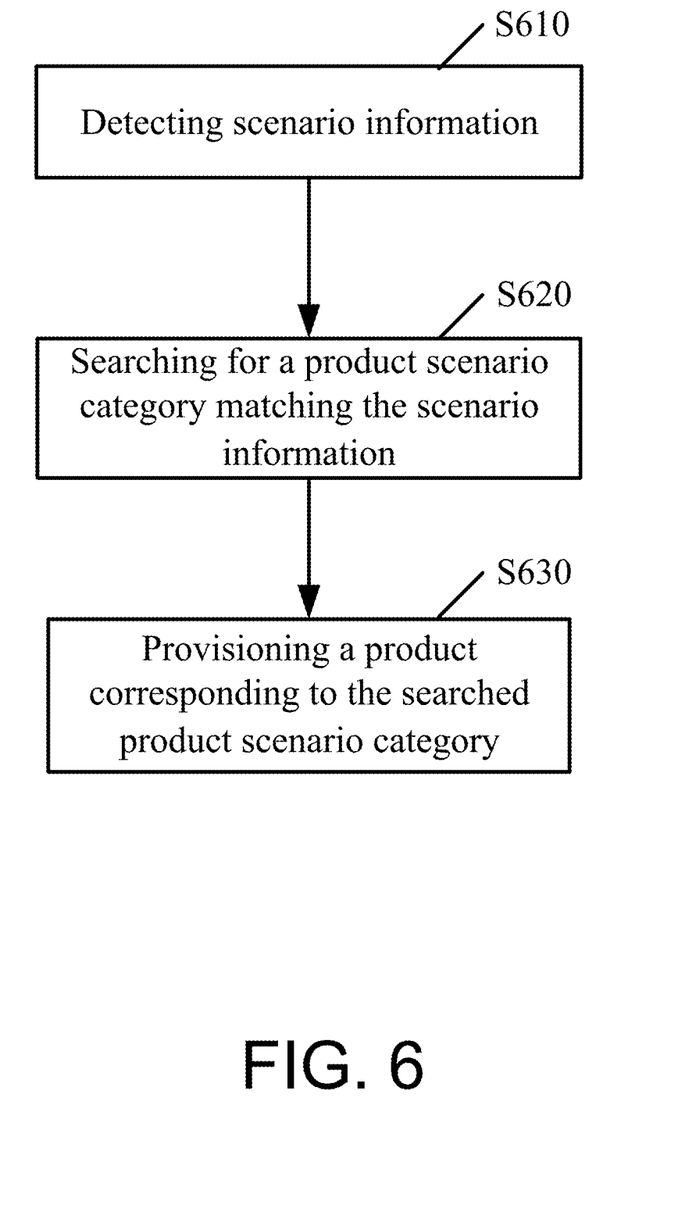
FIG. 6 is a flowchart of the method for recommending a product based on a scenario according to an embodiment of the invention.

FIG. 6 is a flowchart of a method for recommending a product based on a scenario according to an embodiment of the invention. The embodiment will be described in detail below in conjunction with accompany drawings.

As shown in FIG. 6, at block S610, scenario information is detected from the contents posted on the social media. In this block, the detection may be based on keyword matching. Next, at block S620, the product scenario categories obtained by the method of the embodiment shown in FIG. 3 is searched for at least one product scenario category matching the detected scenario information. In this block, the matched product scenario category may be searched by comparing the product scenario information with the tag sequence of the product scenario category. Then, at block S630, a product corresponding to the searched product scenario category may be provisioned as the recommended product suitable for the scenario information.

Moreover, the recommend products may be filtered according to the feature of the customer posting the contents, so as to obtain the product suitable for the customer and provide the filtered recommended products to the customer. The feature of the customer may be obtained by analyzing the profile of the customer, the content history of the customer on various social media and transaction history of the customer on various shopping websites.

It can be seen from the above description that the method of the present embodiment for recommending a product based on a scenario can accurately recommend the relevant products to the customer based on the scenario to meet the customer's demand.

Figure 7:
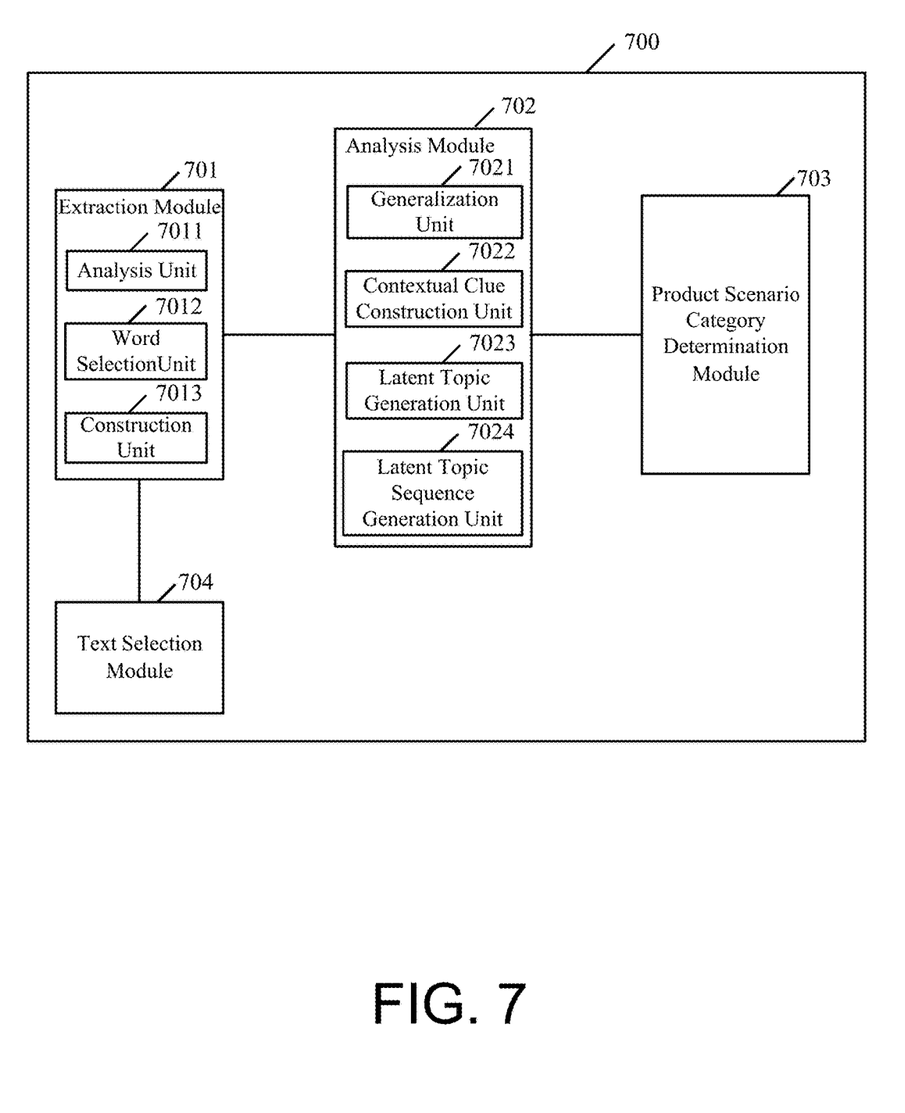
FIG. 7 is an illustrative block diagram of the apparatus for categorizing a use scenario of a product according to an embodiment of the invention.

Under the same inventive conception, FIG. 7 is an illustrative block diagram of the apparatus 700 for categorizing a use scenario of a product according to an embodiment of the invention. The embodiment will be described in detail below in conjunction with accompany drawings, wherein the description of the same parts as those of the above embodiments will be properly omitted.

As shown in FIG. 7, the apparatus 700 of the present embodiment may comprise: an extraction module 701 which extracts, from the product scenario text, at least one feature tuple capable of characterizing the use scenario, wherein the at least one feature tuple comprises a plurality of feature words; an analysis module 702 which performs a latent semantic association analysis on the at least one extracted feature tuple to obtain a latent topic sequence for the use scenario; and a product scenario category determination module 703 which determines the product scenario category to which the use scenario belongs according to the obtained latent topic sequence.

The apparatus 700 of the present embodiment may further comprise a text selection module 704, which selects the product scenario text from the purchase reviews for the product on various shopping websites and/or the contents related to the product posted on social media.

The product scenario text selected by the text selection module 704 is provided to the extraction module 701. In the extraction module 701, an analysis unit 7011 performs syntax and semantic analysis on the product scenario text, then, a word selection unit 7012 selects a target word, a context word and a sentiment word as the feature words. As mentioned above, the target word may be a word representing event, activity, topic, product name or product feature. The context word may be a word representing location, person, time, or entity, noun phrase, or verb phrase. The sentiment word may be a word representing a positive opinion or a word representing a negative opinion. Next, a construction unit 7013 constructs at least one feature tuple by using the selected plurality of feature words. In this embodiment, the feature tuple is a triple which comprises a target word, a context word related to the target word and a sentiment word related to the target word.

The at least one feature tuple obtained by the extraction module 701 is provided to the analysis module 702. In the analysis module 702, a generalization unit 7021 generalizes the respective feature words in each feature tuple into the respective semantic categories. Then, a contextual clue construction unit 7022 constructs, for each semantically generalized feature tuple, the contextual clue of the feature tuple. The contextual clues of the feature tuple may comprise adjacent feature tuples of the feature tuple, and may also comprise noun phrase, verb phrase, transitional word and the like in the product scenario text other than the above feature tuples. Next, n latent topic generation unit 7023 applies a pre-built latent semantic association model to all the feature tuples and their contextual clues to generate the latent topic of the respective feature tuples, and a latent topic sequence generation unit 7024 forms the latent topic sequence using the latent topics of all the feature tuples. The generated latent topic sequence may be used to represent the use scenario described by the product scenario text.

The latent topic sequence obtained by the analysis module 702 is provided to the product scenario category determination module 703. In an embodiment, the product scenario category determination module 703 may be configured to apply a pre-built product scenario categorization model to the latent topic sequence to generate the corresponding product scenario category.

In another embodiment, in the product scenario category determination module 703, a calculation unit calculates similarities between the latent topic sequence and pre-set tag sequences of the product scenario categories. The maximum similarity may be determined based on the calculation result, and the maximum similarity is compared with a similarity threshold. In this embodiment, the similarity threshold is used to determine whether a new product scenario category should be generated. If the calculated maximum similarity is greater than or equal to the similarity threshold, a determination unit determines the product scenario category with the maximum similarity as the product scenario category for the use scenario. If the calculated maximal similarity is less than the similarity threshold, a product scenario category generation unit generates a new product scenario category, wherein the tag sequence of the generated new product scenario category is the latent topic sequence.

It should be noted that, the apparatus 700 of the present embodiment is operable to implement the method for categorizing a use scenario of a product of the embodiments shown in FIG. 3 to FIG. 5.

Figure 8:
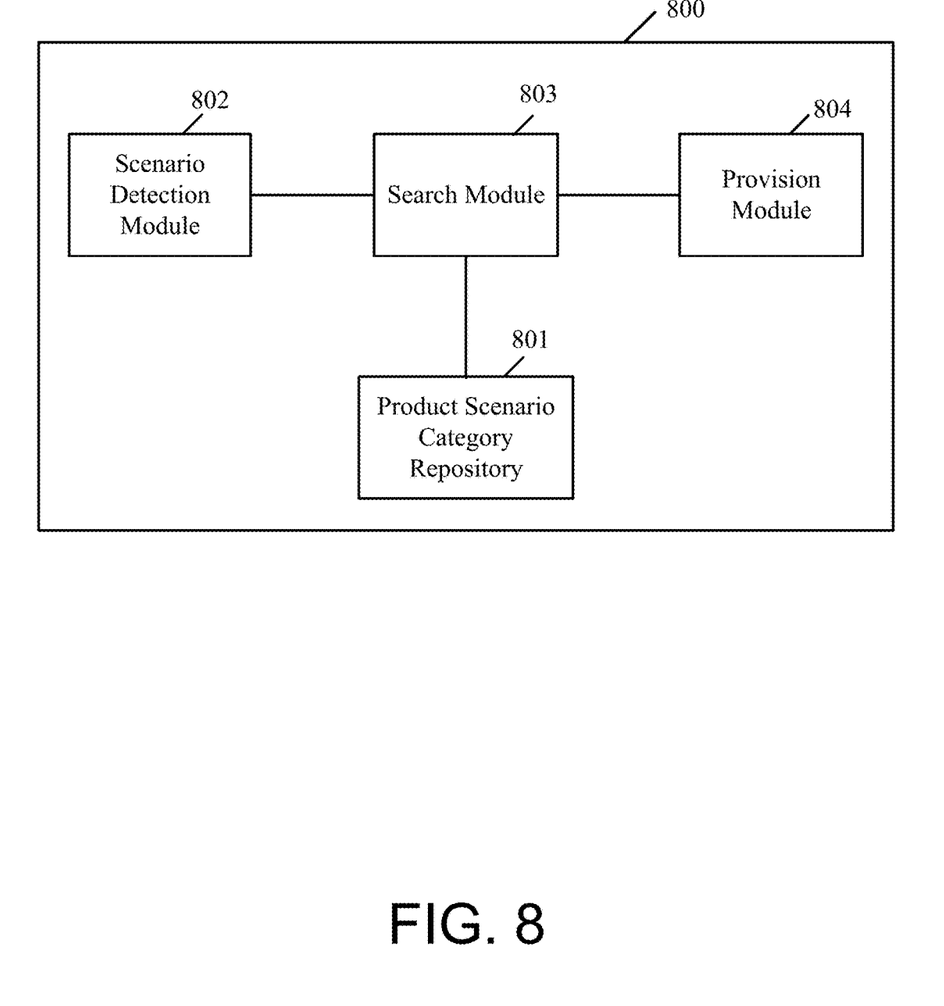
FIG. 8 is an illustrative block diagram of the apparatus for recommending a product based on a scenario according to an embodiment of the invention.

FIG. 8 is an illustrative block diagram of an apparatus 800 for recommending a product based on a scenario according to an embodiment of the invention. The embodiment will be described in detail below in conjunction with accompany drawings, wherein the description of the same parts as those of the above embodiment will be properly omitted.

As shown in FIG. 8, the apparatus 800 of the present embodiment may comprise: a product scenario category repository 801 configured to store product scenario categories obtained by the apparatus 700 of the embodiment shown in FIG. 7; a scenario detection module 802 configured to detect scenario information from the contents posted on social media; a search module 803 configured to search the product scenario category repository 801 for at least one product scenario category matching the detected scenario information; and a provision module 804 configured to provision a product corresponding to the at least one product scenario category.

Moreover, the apparatus 800 of the present embodiment may further comprise a filtering module configured to filter the recommend products according to the feature of a customer posting the contents, so as to obtain a product suitable for the customer. Then, a provision module 803 provides the filtered recommended product to that customer. The feature of the customer may be obtained by analyzing the profile of the customer, content history of the customer on various social media and transaction history of the customer on various shopping websites.

It should be noted that, the apparatus 800 of the present embodiment is operable to implement the method for recommending a product based on a scenario of the embodiment shown in FIG. 6.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for categorizing a use scenario of a product, the computer-implemented comprising:

selecting, by a processor of a computer, text from purchase reviews for the product on shopping websites and contents on social media databases related to the product posted, wherein the computer is communicatively coupled to the shopping websites and the social media databases, wherein the purchase reviews and the contents describe the use scenario of the product, by:
  detecting scenario information from the contents on social media,
  searching the product scenario category repository for at least one product scenario category matching the detected scenario information, and
  provisioning the product corresponding to the at least one product scenario category;
extracting, from the text by the processor of the computer, at least one feature tuple configured to characterize the use scenario by:
  selecting via a syntax and semantic analysis on the text a target word representing the product or an event involved in the use scenario, a context word representing context of the use scenario, and a sentiment word expressing an opinion, wherein a plurality of feature words includes the target word, the context word, and the sentiment word, and
  constructing the at least one feature tuple comprising the plurality of feature words;
performing, by the processor of the computer, a latent semantic association analysis on the at least one feature tuple into respective semantic categories to obtain a latent topic sequence for the use scenario by:
  generalizing the plurality of feature words in the at least one feature tuple to produce generalized feature words,
  constructing a contextual clue for the at least one feature tuple, wherein the contextual clue at least comprises adjacent feature tuples of the at least one feature tuple,
  applying a pre-built latent semantic association model to the generalized feature words of the at least one feature tuple and a corresponding contextual clue to generate latent topics for the at least one feature tuple, and
  generating the latent topic sequence for the use scenario utilizing at least the generalized feature words, the latent topic sequence comprising all the latent topics of the at least one feature tuple;
determining, by the processor of the computer, a product scenario category to which the use scenario belongs according to the latent topic sequence for the use scenario by:
  calculating similarities between the latent topic sequence and pre-set tag sequences of product scenario categories,
  determining the product scenario category with maximum similarity as the product scenario category to which the use scenario belongs, if the calculated maximum similarity is greater than or equal to a similarity threshold, and
  generating a new product scenario category if the calculated maximum similarity is less than the similarity threshold, wherein the tag sequence of the new product scenario category is the latent topic sequence; and
recommending, by the processor of the computer, one or more subsequent products based on the new product scenario category or the product scenario category, the one or more subsequent products being filtered according to the at least one feature tuple so as to be relevant to the product.

2. A computer apparatus for categorizing a use scenario of a product, the computer apparatus comprising:
- a text selection module configured to select a text from purchase reviews for the product on shopping websites and contents on social media databases related to the product posted, wherein the computer apparatus is communicatively coupled to the shopping websites and the social media databases, wherein the purchase reviews and the contents describe the use scenario of the product, by:
  - detecting scenario information from the contents on social media,
  - searching the product scenario category repository for at least one product scenario category matching the detected scenario information, and
  - provisioning the product corresponding to the at least one product scenario category;
- an extraction module configured to extract, from the text, at least one feature tuple configured to characterize the use scenario by utilizing:
  - a word selection unit configured to select via a syntax and semantic analysis on the text a target word representing the product or an event involved in the use scenario, a context word representing context of the use scenario, and a sentiment word expressing an opinion, wherein a plurality of feature words includes the target word, the context word, and the sentiment word, and
  - construction unit configured to construct the at least one feature tuple comprising the plurality of feature words;
- an analysis module configured to perform a latent semantic association analysis on the at least one feature tuple to obtain a latent topic sequence for the use scenario by utilizing:
  - a generalization unit configured to generalize the plurality of feature words in the at least one feature tuple into respective semantic categories to produce generalized feature words, wherein the generalized feature words comprise the respective semantic categories,
  - a contextual clue construction unit configured to construct a contextual clue for the at least one feature tuple, wherein the contextual clue at least comprises adjacent feature tuples of the at least one feature tuple,
  - a latent topic generation unit configured to apply a pre-built latent semantic association model to the at least one feature tuple and a corresponding contextual clue to generate latent topics for the at least one feature tuple, and
  - a latent topic sequence generation unit configured to generate the latent topic sequence utilizing at least the generalized feature words, the latent topic sequence comprising all the latent topics of the at least one feature tuple;
- a product scenario category determination module configured to determine a product scenario category to which the use scenario belongs according to the latent topic sequence for the use scenario by utilizing:
  - a calculation unit configured to calculate similarities between the latent topic sequence and pre-set tag sequences of product scenario categories,
  - a determination unit configured to determine the product scenario category with maximum similarity as the product scenario category to which the use scenario belongs, if the calculated maximum similarity is greater than or equal to a similarity threshold, and
  - a product scenario category generation unit configured to generate a new product scenario category if the calculated maximum similarity is less than the similarity threshold, wherein the tag sequence of the new product scenario category is the latent topic sequence; and
- recommending one or more subsequent products based on the new product scenario category or the product scenario category, the one or more subsequent products being filtered according to the at least one feature tuple so as to be relevant to the product.

* * * * *